US010375025B2

(12) United States Patent
Zheng et al.

(10) Patent No.: US 10,375,025 B2
(45) Date of Patent: Aug. 6, 2019

(54) VIRTUAL PRIVATE NETWORK IMPLEMENTATION METHOD AND CLIENT DEVICE

(71) Applicant: Huawei Technologies Co., Ltd., Shenzhen (CN)

(72) Inventors: Xiaofeng Zheng, Hangzhou (CN); Yinghua Zhu, Hangzhou (CN); Tingke Ge, Hangzhou (CN); Fei Zhao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 201 days.

(21) Appl. No.: 15/426,386

(22) Filed: Feb. 7, 2017

(65) Prior Publication Data

US 2017/0149738 A1 May 25, 2017

Related U.S. Application Data

(63) Continuation of application No. PCT/CN2015/072246, filed on Feb. 4, 2015.

(30) Foreign Application Priority Data

Aug. 8, 2014 (CN) .......................... 2014 1 0388867

(51) Int. Cl.
*H04L 29/06* (2006.01)

(52) U.S. Cl.
CPC ........ *H04L 63/0272* (2013.01); *H04L 63/029* (2013.01); *H04L 63/166* (2013.01); *H04L 69/16* (2013.01); *H04L 67/42* (2013.01)

(58) Field of Classification Search
CPC . H04L 63/0272; H04L 63/029; H04L 63/166; H04L 69/16; H04L 67/42

(Continued)

(56) References Cited

U.S. PATENT DOCUMENTS

2006/0031407 A1 2/2006 Dispensa et al.
2010/0161960 A1* 6/2010 Sadasivan ........... H04L 63/0272
713/152

(Continued)

FOREIGN PATENT DOCUMENTS

CN 101072108 A 11/2007
CN 102065059 A 5/2011

(Continued)

OTHER PUBLICATIONS

Wei, L., et al., "Design and Implementation of IPSec VPN at Windows Platform," Microcomputer Information, 2006, 5 pages.

(Continued)

*Primary Examiner* — Evans Desrosiers
(74) *Attorney, Agent, or Firm* — Conley Rose, P.C.

(57) ABSTRACT

A virtual private network implementation method includes intercepting, by an NDIS intermediate driver, a packet sent by an application program to an intranet server, and determining, according to a PID corresponding to the packet, whether to allow a process corresponding to the packet to use an SSL VPN; when the process corresponding to the packet is allowed to use the SSL VPN, establishing, by the NDIS intermediate driver, a new packet, and submitting the new packet to an NDIS network interface card driver; and sending, by the NDIS network interface card driver, the new packet to the client, and sending, by the client, the new packet to the intranet server. Thereby, a virtual private network is implemented based on process control, and a client has a fast startup speed.

12 Claims, 3 Drawing Sheets

(58) Field of Classification Search
USPC .......................................................... 726/15
See application file for complete search history.

(56) References Cited

U.S. PATENT DOCUMENTS

| | | | | |
|---|---|---|---|---|
| 2012/0303949 A1* | 11/2012 | Liu | H04L 63/0272 | 713/153 |
| 2013/0128892 A1* | 5/2013 | Rao | H04L 12/2856 | 370/392 |
| 2013/0297814 A1 | 11/2013 | Annamalaisami et al. | | |

FOREIGN PATENT DOCUMENTS

| | | |
|---|---|---|
| CN | 102065125 A | 5/2011 |
| EP | 2590368 A1 | 5/2013 |

OTHER PUBLICATIONS

Foreign Communication From A Counterpart Application, Chinese Application No. 201410388867.9, Chinese Office Action dated Jan. 2, 2018, 6 pages.

Foreign Communication From A Counterpart Application, European Application No. 15829052.8, Extended European Search Report dated Apr. 28, 2017, 10 pages.

Foreign Communication From A Counterpart Application, PCT Application No. PCT/CN2015/072246, English Translation of International Search Report dated Mar. 30, 2015, 2 pages.

Foreign Communication From A Counterpart Application, PCT Application No. PCT/CN2015/072246, English Translation of Written Opinion dated Mar. 30, 2015, 6 pages.

* cited by examiner

VIRTUAL PRIVATE NETWORK IMPLEMENTATION METHOD AND CLIENT DEVICE

CROSS-REFERENCE TO RELATED APPLICATIONS

This application is a continuation of International Patent Application No. PCT/CN2015/072246 filed on Feb. 4, 2015, which claims priority to Chinese Patent Application No. 201410388867.9 filed on Aug. 8, 2014, both of which are hereby incorporated by reference in their entireties.

TECHNICAL FIELD

Embodiments of the present disclosure relate to computer technologies, and in particular, to a virtual private network implementation method and a client device.

BACKGROUND

A virtual private network (VPN) is a secure and stable tunnel passing through a public network. A temporary and secure connection is established on a public network by transmitting network data obtained after encapsulation and encryption. Therefore, transmission of private data on the public network can reach a security level of a private network. Two commonly used VPN technologies are separately a VPN technology based on a conventional network security protocol and a VPN over Secure Sockets Layer (SSL) technology. The former is mainly applied to a network layer, and the latter is mainly applied to an application layer. An SSL VPN is a VPN technology based on the SSL. The SSL VPN uses a certificate-based mechanism that is of identity authentication, data encryption, and message integrity check and that is provided by the SSL protocol, to ensure that a user remotely accesses an internal network of a company (hereinafter referred to as the intranet) in a secure manner. The SSL VPN may be used in multiple manners, and a layer 3 SSL VPN is used most widely. Network drivers include a Transport Driver Interface (TDI) driver and a Network Driver Interface Specification (NDIS) driver. The NDIS driver may be further divided into a protocol driver, an intermediate driver, and a network interface card driver. The layer 3 SSL VPN requires client software to be installed. After an SSL VPN client (hereinafter referred to as the client) is started to log in to an SSL VPN gateway (hereinafter referred to as the gateway), the client and the gateway establish an SSL tunnel. The client applies to the gateway for a virtual internet protocol (IP) address, and the client configures a user operating system, so that an application program in the system can access an intranet server using the virtual IP address. The client intercepts a packet using the virtual IP address, and forwards the intercepted packet to the gateway using the previously established SSL tunnel. The gateway forwards the packet to the intranet server.

In the prior art, a new virtual network interface card is established in a user operating system when a client is installed, and the virtual network interface card is normally in a disabled state. When the client is started to log in to a gateway, the client obtains a virtual IP address from the gateway through application. The client starts the virtual network interface card, and sets the obtained virtual IP address through application as an address of the virtual network interface card. When a process accesses the intranet server using the virtual network interface card, data sent by the application program is sent downwards through a driver stack. When the data is finally sent to the virtual network interface card, the virtual network interface card receives a packet delivered by an upper-layer, and submits the packet to the client. The client sends the packet to the gateway using the SSL tunnel established during login, and the gateway forwards the packet to the intranet server.

Problems in the prior art are as follows: Because all processes in a system can use a virtual network interface card, and access an intranet server, there is no way to limit access of some processes; and because the virtual network interface card also needs to be started when a client is started, the client has a slow startup speed.

SUMMARY

Embodiments of the present disclosure provide a virtual private network implementation method and a client device to resolve problems in the prior art that access of a process cannot be controlled, and a client has a slow startup speed because a virtual network interface card also needs to be started when the client is started.

According to a first aspect, an embodiment of the present disclosure provides a virtual private network implementation method, where the method is applied to a virtual private network over SSL VPN, the SSL VPN includes a client device, a gateway, and an intranet server of the SSL VPN, the client device communicates with the intranet server using the gateway, the client device includes a TDI driver, a NDIS protocol driver, a NDIS intermediate driver, a NDIS network interface card driver, and a client, and the method includes intercepting, by the NDIS intermediate driver, a packet sent by an application program to the intranet server, and determining, according to a process identification (PID) corresponding to the packet, whether to allow a process corresponding to the packet to use the SSL VPN; if the process corresponding to the packet is allowed to use the SSL VPN, establishing, by the NDIS intermediate driver, a new packet, setting a destination address of the new packet as a local address of the client device on which the application program is located, setting a destination port number of the new packet as a port number using which the client receives the packet, changing a source IP address of the original packet to a virtual IP address, using the original packet as a payload of the new packet, and submitting the new packet to the NDIS network interface card driver, where the virtual IP address is a virtual IP address obtained from the gateway after the client and the gateway establish a SSL tunnel; and sending, by the NDIS network interface card driver, the new packet to the client, and sending, by the client, the new packet to the intranet server.

With reference to the first aspect, in a first implementation manner of the first aspect, the determining, according to a PID corresponding to the packet, whether to allow a process corresponding to the packet to use the SSL VPN includes obtaining a protocol type and a port number of the packet, determining, according to a mapping relationship between a protocol type and a port number, and a PID, the PID corresponding to the packet, and determining, according to the PID, whether to allow the process corresponding to the PID to use the SSL VPN.

With reference to the first aspect, or the first implementation manner of the first aspect, in a second implementation manner of the first aspect, before the intercepting, by the NDIS intermediate driver, a packet sent by an application program to the intranet server, the method further includes obtaining, by the TDI driver, information about a packet flow for sending the packet, where the information includes the protocol type, the port number, and the PID; notifying the NDIS intermediate driver of the information; and storing, by the NDIS intermediate driver, the mapping relationship between the information.

With reference to the first aspect, or the first or the second implementation manner of the first aspect, in a third implementation manner of the first aspect, before the determining, according to a PID corresponding to the packet, whether to allow a process corresponding to the packet to use the SSL VPN, the method further includes setting, in the NDIS intermediate driver by the client, a PID indicating whether to allow the process corresponding to the packet to use the SSL VPN.

With reference to any one of the first aspect, or the first to the third implementation manners of the first aspect, in a fourth implementation manner of the first aspect, the method further includes receiving, by the client, a packet from the intranet server that is forwarded by the gateway, changing a destination address of the packet to the local address of the client device on which the client is located, sending the packet to the NDIS protocol driver using a raw socket interface, and forwarding, by the NDIS protocol driver, the packet to a corresponding application program.

According to a second aspect, an embodiment of the present disclosure provides a client device applied to a virtual private network over SSL VPN, where the SSL VPN includes a client device, a gateway, and an intranet server of the SSL VPN, the client device communicates with the intranet server using the gateway, and the client device includes a TDI driver, a NDIS protocol driver, a NDIS intermediate driver, a NDIS network interface card driver, and a client, where the NDIS intermediate driver is configured to intercept a packet sent by an application program to the intranet server, and determine, according to a PID corresponding to the packet, whether to allow a process corresponding to the packet to use the SSL VPN, and if the process corresponding to the packet is allowed to use the SSL VPN, establish a new packet, set a destination address of the new packet as a local address of the client device on which the application program is located, set a destination port number of the new packet as a port number using which the client receives the packet, change a source IP address of the original packet to a virtual IP address, use the original packet as a payload of the new packet, and submit the new packet to the NDIS network interface card driver, where the virtual IP address is a virtual IP address obtained from the gateway after the client and the gateway establish a SSL tunnel; and the NDIS network interface card driver is configured to send the new packet to the client, so that the client sends the new packet to the intranet server.

With reference to the second aspect, in a first implementation manner of the second aspect, the NDIS intermediate driver is configured to obtain a protocol type and a port number of the packet, determine, according to a mapping relationship between a protocol type and a port number, and a PID, the PID corresponding to the packet, and determine, according to the PID, whether to allow the process corresponding to the PID to use the SSL VPN.

With reference to the second aspect, or the first implementation manner of the second aspect, in a second implementation manner of the second aspect, the TDI driver is configured to obtain information about a packet flow for sending the packet, where the information includes the protocol type, the port number, and the PID; and notify the NDIS intermediate driver of the information, so that the NDIS intermediate driver stores the mapping relationship between the information.

With reference to the second aspect, or the first or the second implementation manner of the second aspect, in a third implementation manner of the second aspect, the client is configured to set, in the NDIS intermediate driver, a PID indicating whether to allow the process corresponding to the packet to use the SSL VPN.

With reference to any one of the second aspect, or the first to the third implementation manners of the second aspect, in a fourth implementation manner of the second aspect, the client is further configured to receive a packet from the intranet server that is forwarded by the gateway, change a destination address of the packet to the local address of the client device on which the client is located, and send the packet to the NDIS protocol driver using a raw socket Raw Socket interface, so that the NDIS protocol driver forwards the packet to a corresponding application program.

According to the virtual private network implementation method and the client device in the embodiments of the present disclosure, an NDIS intermediate driver intercepts a packet sent by an application program to an intranet server, and determines, according to a PID corresponding to the packet, whether to allow a process corresponding to the packet to use an SSL VPN. If the process corresponding to the packet is allowed to use the SSL VPN, the NDIS intermediate driver establishes a new packet, sets a destination address of the new packet as a local address of the client device on which the application program is located, sets a destination port number of the new packet as a port number using which a client receives the packet, changes a source IP address of the original packet to a virtual IP address, uses the original packet as a payload of the new packet, and submits the new packet to an NDIS network interface card driver. The virtual IP address is a virtual IP address obtained from a gateway after the client and the gateway establish a SSL tunnel. The NDIS network interface card driver sends the new packet to the client, so that the client sends the new packet to the intranet server. Therefore, whether to allow the process to use the SSL VPN is determined according to the PID of the process, a virtual private network based on process control is implemented, and a startup speed of the client is obviously improved because a virtual network interface card is no more used.

BRIEF DESCRIPTION OF DRAWINGS

To describe the technical solutions in the embodiments of the present disclosure more clearly, the following briefly describes the accompanying drawings required for describing the embodiments or the prior art. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
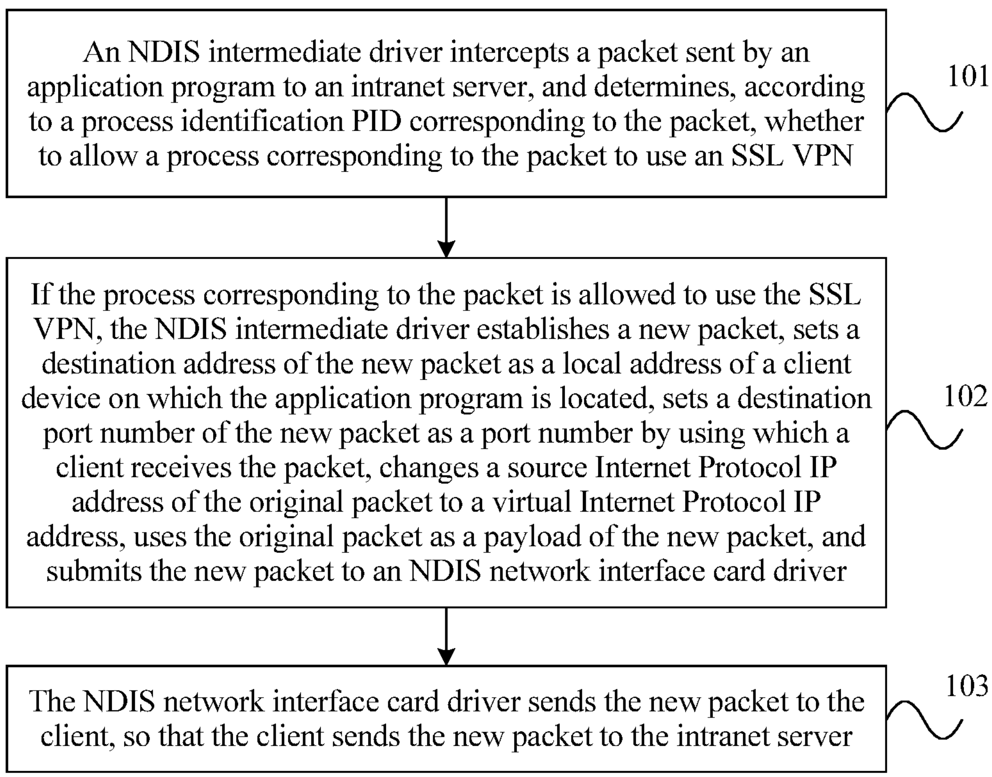
FIG. 1 is a flowchart of a virtual private network implementation method according to an embodiment of the present disclosure.
Figure 2:
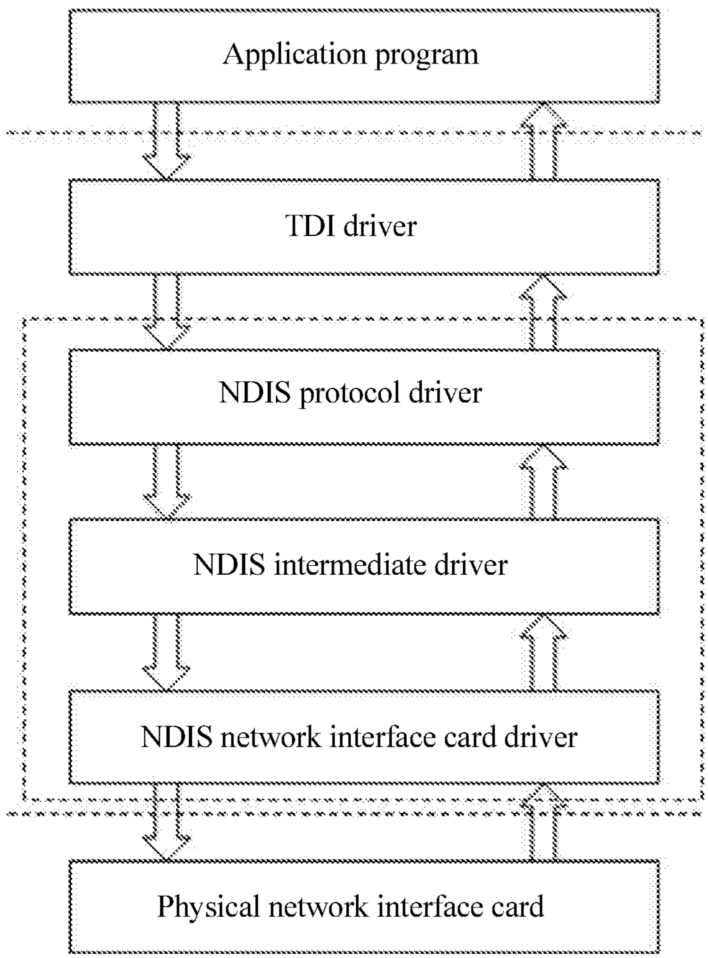
FIG. 2 is a structural diagram of a network driver according to an embodiment of the present disclosure.
Figure 3:
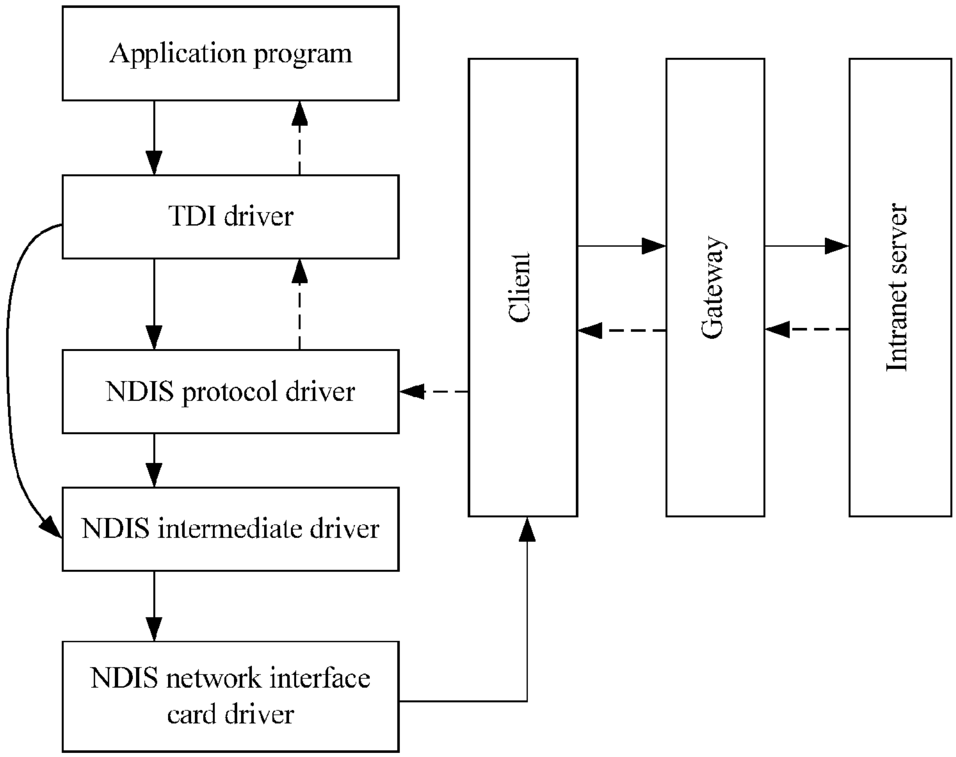
FIG. 3 is an architectural diagram of a network according to an embodiment of the present disclosure.

FIG. 1 is a flowchart of a VPN implementation method according to an embodiment of the present disclosure. FIG. 2 is a structural diagram of a network driver according to an embodiment of the present disclosure. FIG. 3 is an architectural diagram of a network according to an embodiment of the present disclosure. The method may be executed by a client device. As shown in FIG. 1, the method may be applied to a virtual private network over SSL VPN. The SSL VPN includes a client device, a gateway, and an intranet server of the SSL VPN. The client device communicates with the intranet server using the gateway. The client device includes a TDI driver, a NDIS protocol driver, a NDIS intermediate driver, a NDIS network interface card driver, and a client. The method includes the following steps.

Step 101: The NDIS intermediate driver intercepts a packet sent by an application program to the intranet server, and determines, according to a PID corresponding to the packet, whether to allow a process corresponding to the packet to use the SSL VPN.

FIG. 2 shows a hierarchical structure of network drivers in a Windows operating system. In the embodiment of the present disclosure, the packet is intercepted by the NDIS intermediate driver. The network drivers in the Windows operating system include a TDI driver and a NDIS driver. The NDIS driver may be further divided into an NDIS protocol driver, an NDIS intermediate driver, and an NDIS network interface card driver. The NDIS protocol driver implements a specific network protocol (for example, tcpip.sys). The NDIS network interface card driver implements an operation on a physical network interface card. The NDIS intermediate driver is located between the NDIS network interface card driver and the NDIS protocol driver. The NDIS intermediate driver provides a miniport function set for an upper-layer driver, and provides a protocol function set for a lower-layer driver. Therefore, for an upper-layer driver, the NDIS intermediate driver is a miniport driver; and for a bottom-layer driver, the NDIS intermediate driver is a protocol driver.

The TDI driver can obtain process information of current communication, but the NDIS driver cannot obtain the process information of the current communication.

As shown in FIG. 3, solid straight arrows in FIG. 3 indicate a data flow direction in which the application program sends a packet to the intranet server, and dashed straight arrows indicate a data flow direction in which the intranet server sends a packet to the application program. The application program on the client device sends the packet to the intranet server. The NDIS intermediate driver intercepts the packet, and determines, according to a PID corresponding to the obtained packet, whether to allow a process corresponding to the packet to use the SSL VPN.

Step 102: If the process corresponding to the packet is allowed to use the SSL VPN, the NDIS intermediate driver establishes a new packet, sets a destination address of the new packet as a local address of the client device on which the application program is located, sets a destination port number of the new packet as a port number using which the client receives the packet, changes a source IP address of the original packet to a virtual IP address, uses the original packet as a payload of the new packet, and submits the new packet to the NDIS network interface card driver.

The virtual IP address is a virtual IP address obtained from the gateway after the client and the gateway establish an SSL tunnel.

If the NDIS intermediate driver determines that the process corresponding to the packet is allowed to use the SSL VPN, the NDIS intermediate driver establishes the new packet, sets the destination address of the new packet as the local address of the client device on which the application program is located, sets the destination port number of the new packet as the port number using which the client receives the packet, calculates a new checksum, changes the source IP address of the original packet to the virtual IP address obtained from the gateway through application, uses the original packet as the payload of the new packet (copies the original packet into the new packet), and submits the new packet to the NDIS network interface card driver.

The NDIS intermediate driver needs to allocate a new block of memory to store the new packet. A length of the new packet is a length obtained by adding a length of the original packet to lengths of a User Datagram Protocol (UDP) header and an IP header. The IP header includes the destination address and the checksum, and the UDP header includes the destination port number and the checksum. The original packet is used as the payload of the new packet, and is copied into the new packet. The UDP header and the IP header are filled in the new packet. Then, the new packet is submitted to a next-layer driver. In this way, the new packet including the original packet (includes a payload of the original packet, a Transmission Control Protocol (TCP)/UDP header of the original packet, and an IP header of the original packet) is sent to the client. The client receives the new packet, and directly forwards the new packet to the gateway.

For the foregoing virtual IP address, after the client is started, the client and the gateway establish the SSL tunnel, and the client obtains the virtual IP address.

Optionally, the method further includes, if the process corresponding to the packet is not allowed to use the SSL VPN, directly submitting the packet to the NDIS network interface card driver.

Step 103: The NDIS network interface card driver sends the new packet to the client, so that the client sends the new packet to the intranet server.

The NDIS network interface card driver sends the new packet to the client, and the client sends the new packet to the intranet server using the gateway. If the process corresponding to the packet is not allowed to use the SSL VPN, the original packet is directly sent to the NDIS network interface card driver.

In this embodiment, an NDIS intermediate driver intercepts a packet sent by an application program to an intranet server, and determines, according to a PID corresponding to the packet, whether to allow a process corresponding to the packet to use an SSL VPN. If the process corresponding to the packet is allowed to use the SSL VPN, the NDIS intermediate driver establishes a new packet, sets a destination address of the new packet as a local address of a client device on which the application program is located, sets a destination port number of the new packet as a port number using which a client receives the packet, changes a source IP address of the original packet to a virtual IP address, uses the original packet as a payload of the new packet, and submits the new packet to an NDIS network interface card driver. The virtual IP address is a virtual IP address obtained from a gateway after the client and the gateway establish a Secure Sockets Layer SSL tunnel. The NDIS network interface card driver sends the new packet to the client, so that the client sends the new packet to the intranet server. Therefore, whether to allow the process to use the SSL VPN is determined according to the PID of the process, a virtual private network based on process control is implemented, and a startup speed of the client is obviously improved because a virtual network interface card is no more used. Thereby, user experience is improved.

The following describes in detail the technical solution in the method embodiment shown in FIG. 1 with reference to specific embodiments.

Before the NDIS intermediate driver establishes the new packet, the method further includes starting, by the client, a UDP to receive a packet, and notifying the NDIS intermediate driver of a port number for receiving the packet and the virtual IP address.

After the client is started, first, the client and the gateway establish the SSL tunnel, and the client obtains the virtual IP address. The client starts a UDP to receive a forwarded packet, notifies the NDIS intermediate driver of the port number for receiving the packet and the virtual IP address using DeviceIoControl. Then, the application program initiates establishment of a connection to the intranet server, or sends a first UDP packet.

The client may communicate with the NDIS intermediate driver using the DeviceIoControl.

Optionally, the determining, according to a PID corresponding to the packet, whether to allow a process corresponding to the packet to use the SSL VPN includes obtaining a protocol type and a port number of the packet, determining, according to a mapping relationship between a protocol type and a port number, and a PID, the PID corresponding to the packet, and determining, according to the PID, whether to allow the process corresponding to the PID to use the SSL VPN.

Optionally, before the NDIS intermediate driver intercepts the packet sent by the application program to the intranet server, the method further includes obtaining, by the TDI driver, information about a packet flow for sending the packet, where the information includes the protocol type, the port number, and the PID; notifying the NDIS intermediate driver of the information; and storing, by the NDIS intermediate driver, the mapping relationship between the information.

In the embodiment of the present disclosure, the NDIS intermediate driver completes determining, according to the PID of the process, whether to allow the process to use the SSL VPN. However, the NDIS intermediate driver does not have a capability of identifying a process that sends the packet, but the TDI driver has the capability. A flow table of a mapping relationship between a protocol type and a port number, and a PID may be maintained in the NDIS intermediate driver to implement the capability. Each record in the flow table represents a mapping relationship. The NDIS intermediate driver determines, according to content of the flow table, whether to allow the process corresponding to the intercepted packet to use the SSL VPN. The TDI driver is responsible for intercepting an action of creating or deleting a packet flow for sending the packet, and is responsible for sending information about the packet flow (a PID, a protocol type, and a port number for establishing the packet flow) to the NDIS intermediate driver. A solid curved arrow shown in FIG. 3 indicates a packet flow direction from the TDI driver to the NDIS intermediate driver. The NDIS intermediate driver maintains the flow table, and performs addition or deletion on the flow table according to a notification from the TDI driver.

TABLE 1

| PID | Protocol Type | Port Number |
|---|---|---|
| 765 | UDP | 5693 |
| 865 | TCP | 8790 |
| 259 | TCP | 6666 |
| 543 | UDP | 34555 |

Each record in Table 1 includes the PID, the protocol type, and the port number for creating the packet flow. When the application program and the intranet server establish a new TCP connection (or when a first UDP packet is sent), the TDI driver intercepts the action, obtains a PID, a protocol type, and a port number of a currently initiated packet flow, and notifies the NDIS intermediate driver using DeviceIoControl. The NDIS intermediate driver adds a record into Table 1 according to received content. When determining, according to the protocol type and the port number of the packet, the PID of the process corresponding to the packet, the NDIS intermediate driver uses the table to perform determining.

When a packet passes the NDIS intermediate driver, the NDIS intermediate driver obtains a protocol type and a port number of the packet from the packet, searches Table 1 according to the protocol type and the port number for a PID of a process that sends the packet, and may further search, for the PID, a PID table of processes that are allowed to use the SSL VPN. If the PID is found in the PID table, the process corresponding to the packet is allowed to use the SSL VPN.

Optionally, before the determining, according to a PID corresponding to the packet, whether to allow a process corresponding to the packet to use the SSL VPN, the method further includes setting, in the NDIS intermediate driver by the client, a PID indicating whether to allow the process corresponding to the packet to use the SSL VPN.

The NDIS intermediate driver may further maintain the PID table of the processes that are allowed to use the SSL VPN, and may record PIDs of the processes that are allowed to use the SSL VPN. The NDIS intermediate driver provides, using DeviceIoControl, an interface for the SSL VPN client to use. A user may use the client to add or delete a PID of a process that is allowed to use the SSL VPN into or from the table maintained in the NDIS intermediate driver. The NDIS intermediate driver uses the table when determining whether to allow a process corresponding to a packet to use the SSL VPN. If a PID of the process that sends the packet is found in the table, it indicates that the process corresponding to the packet is allowed to use the SSL VPN.

The PID table of the processes that are allowed to use the SSL VPN is controlled. Therefore, it can be implemented that only an application program running in a security sandbox is allowed to access the intranet server.

The PID table of the processes that are allowed to use the SSL VPN is expanded. Therefore, it can be implemented that multiple clients are corresponding to one PID table of processes that are allowed to use the SSL VPN, and that multiple clients use at the same time the PID table of the processes that are allowed to use the SSL VPN.

In this embodiment of the present disclosure, control of using the SSL VPN is improved to a process-level control granularity thanks to change of a packet interception location and cooperation with the TDI driver. In addition, a virtual network interface card is no more needed to be used in an operating system of the client device. Therefore, a startup speed of the client is obviously improved, so that user experience of a product is improved.

Optionally, the method in this embodiment further includes, when the application program closes a packet flow established by the application program and the intranet server, obtaining, by the TDI driver, a protocol type, a port number, and a PID of the currently closed packet flow, notifying the NDIS intermediate driver, and deleting, by the NDIS intermediate driver, the stored mapping relationship between the PID, a protocol type, and a port number.

For example, when the application program closes a TCP connection, the TDI driver intercepts the action, obtains a PID, a protocol type, and a port number of a process corresponding to the currently closed connection, and notifies the NDIS intermediate driver using DeviceIoControl. The NDIS intermediate driver searches Table 1 for a corresponding record, and deletes the found record from Table 1.

Optionally, as shown in FIG. 3, that the NDIS network interface card driver sends the new packet to the client, so that the client sends the new packet to the intranet server includes sending, by the client, the new packet to the gateway using the SSL tunnel, and forwarding, by the gateway, the new packet to the intranet server.

Optionally, the method further includes receiving, by the client, a packet from the intranet server that is forwarded by the gateway, changing a destination address of the packet to the local address of the client device on which the client is located, sending the packet to the NDIS protocol driver using a raw socket Raw Socket interface, and forwarding, by the NDIS protocol driver, the packet to a corresponding application program.

As shown in FIG. 3, when the client receives, from the SSL tunnel, the packet that is sent by the intranet server to the application program and that is forwarded by the gateway, the client checks a checksum of the packet. If the check succeeds, the client changes the destination address of the packet to the local address, recalculates a checksum, and sends the packet to the NDIS protocol driver using the Raw Socket interface, so that the NDIS protocol driver directly sends the packet to an application program of the client device. The NDIS protocol driver may submit the packet to a proper application program according to content of the packet.

An implementation principle and a technical effect of this embodiment are similar to those of the first method embodiment, and details are not described herein again.

Figure 4:
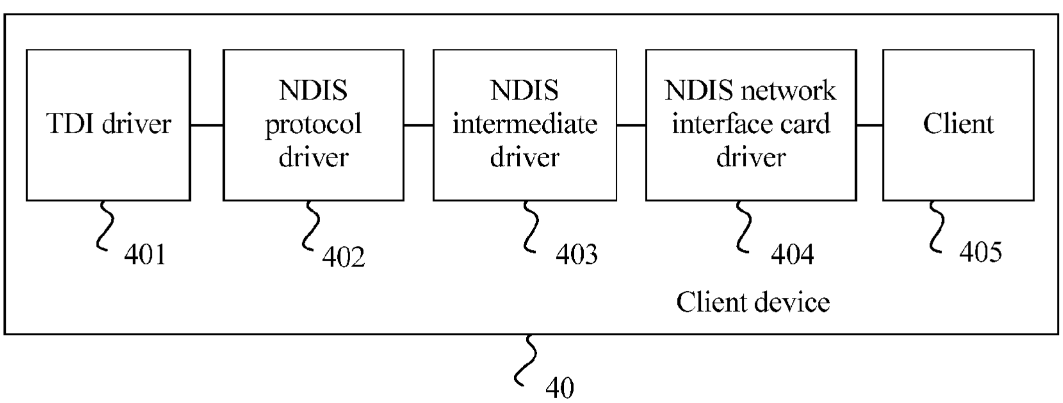
FIG. 4 is a schematic structural diagram of a client device according to an embodiment of the present disclosure.

FIG. 4 is a schematic structural diagram of a client device according to a first device embodiment of the present disclosure. As shown in FIG. 4, the client device 40 in this embodiment is applied to a virtual private network over SSL VPN. The SSL VPN includes a client device 40, a gateway, and an intranet server of the SSL VPN. The client device communicates with the intranet server using the gateway. The client device 40 includes a TDI driver 401, an NDIS protocol driver 402, an NDIS intermediate driver 403, an NDIS network interface card driver 404, and a client 405.

The NDIS intermediate driver 403 is configured to intercept a packet sent by an application program to the intranet server; determine, according to a PID corresponding to the packet, whether to allow a process corresponding to the packet to use the SSL VPN; if the process corresponding to the packet is allowed to use the SSL VPN, establish a new packet; set a destination address of the new packet as a local address of the client device on which the application program is located; set a destination port number of the new packet as a port number using which the client 405 receives the packet; change a source IP address of the original packet to a virtual IP address; use the original packet as a payload of the new packet; and submit the new packet to the NDIS network interface card driver 404. The virtual IP address is a virtual IP address obtained from the gateway after the client 405 and the gateway establish a SSL tunnel.

The NDIS network interface card driver 404 is configured to send the new packet to the client 405, so that the client 405 sends the new packet to the intranet server.

Optionally, the NDIS intermediate driver 403 is configured to obtain a protocol type and a port number of the packet, determine, according to a mapping relationship between a protocol type and a port number, and a PID, the PID corresponding to the packet, and determine, according to the PID, whether to allow the process corresponding to the PID to use the SSL VPN.

Optionally, the TDI driver 401 is configured to obtain information about a packet flow for sending the packet, where the information includes the protocol type, the port number, and the PID; and notify the NDIS intermediate driver 403 of the information, so that the NDIS intermediate driver 403 stores the mapping relationship between the information.

Optionally, the client 405 is configured to set, in the NDIS intermediate driver 403, a PID indicating whether to allow the process corresponding to the packet to use the SSL VPN.

Optionally, the client 405 is further configured to receive a packet from the intranet server that is forwarded by the gateway, change a destination address of the packet to the local address of the client device on which the client 405 is located, and send the packet to the NDIS protocol driver 402 using a raw socket Raw Socket interface, so that the NDIS protocol driver 402 forwards the packet to a corresponding application program.

In the several embodiments provided in the present application, it should be understood that the disclosed device and method may be implemented in other manners. For example, the described device embodiment is merely exemplary. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. Some or all of the modules may be selected according to actual needs to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A virtual private network implementation method applied to a virtual private network over Secure Sockets Layer (SSL VPN), wherein the SSL VPN comprises a client device, a gateway, and an intranet server of the SSL VPN, wherein the client device communicates with the intranet server using the gateway, wherein the client device comprises a Transport Driver Interface (TDI) driver, a Network Driver Interface Specification (NDIS) protocol driver, a NDIS intermediate driver, a NDIS network interface card driver, and a client, and wherein the method comprises:

intercepting, by the NDIS intermediate driver, an original packet sent by an application program to the intranet server;

determining, according to a process identification (PID) corresponding to the original packet, whether to allow a process corresponding to the original packet to use the SSL VPN by:

obtaining a protocol type and a port number of the original packet;

determining, according to a mapping relationship between a protocol type, a port number, and a PID, the PID corresponding to the original packet; and determining, according to the PID, whether to allow the process corresponding to the PID to use the SSL VPN;

establishing, by the NDIS intermediate driver, a new packet when the process corresponding to the original packet is allowed to use the SSL VPN;

setting a destination address of the new packet as a local address of the client device on which the application program is located;

setting a destination port number of the new packet as a port number by which the client receives the original packet;

changing a source Internet Protocol (IP) address of the original packet to a virtual Internet Protocol IP address;

using the original packet as a payload of the new packet;

submitting the new packet to the NDIS network interface card driver, wherein the virtual IP address is a virtual IP address obtained from the gateway after the client and the gateway establish a Secure Sockets Layer (SSL) tunnel;

sending, by the NDIS network interface card driver, the new packet to the client; and sending, by the client, the new packet to the intranet server.

2. The method according to claim 1, wherein before intercepting, by the NDIS intermediate driver, the original packet sent by the application program to the intranet server, the method further comprises:

obtaining, by the TDI driver, information about a packet flow for sending the original packet, wherein the information comprises the protocol type, the port number, and the PID;

notifying the NDIS intermediate driver of the information; and storing, by the NDIS intermediate driver, the mapping relationship between the information.

3. The method according to claim 1, wherein before determining, according to the PID corresponding to the original packet, whether to allow the process corresponding to the original packet to use the SSL VPN, the method further comprises setting, in the NDIS intermediate driver by the client, a PID indicating whether to allow the process corresponding to the original packet to use the SSL VPN.

4. The method according to claim 1, further comprising:

receiving, by the client, a packet from the intranet server that is forwarded by the gateway;

changing a destination address of the packet to the local address of the client device on which the client is located;

sending the packet to the NDIS protocol driver using a raw socket interface; and forwarding, by the NDIS protocol driver, the packet to a corresponding application program.

5. A client device, applied to a virtual private network over Secure Sockets Layer (SSL VPN), wherein the SSL VPN comprises a client device, a gateway, and an intranet server of the SSL VPN, wherein the client device communicates with the intranet server using the gateway, wherein the client device comprises:

a client;

a Transport Driver Interface (TDI) driver;

a Network Driver Interface Specification (NDIS) protocol driver;

a NDIS network interface card driver; and a NDIS intermediate driver configured to:

intercept an original packet sent by an application program to the intranet server;

determine, according to a process identification (PID) corresponding to the original packet, whether to allow a process corresponding to the original packet to use the SSL VPN by:

obtaining a protocol type and a port number of the original packet;

determining, according to a mapping relationship between a protocol type, a port number, and a PID, the PID corresponding to the original packet; and determining, according to the PID, whether to allow the process corresponding to the PID to use the SSL VPN;

establish a new packet when the process corresponding to the original packet is allowed to use the SSL VPN;

set a destination address of the new packet as a local address of the client device on which the application program is located;

set a destination port number of the new packet as a port number by which the client receives the original packet;

change a source Internet Protocol (IP) address of the original packet to a virtual IP address;

use the original packet as a payload of the new packet; and submit the new packet to the NDIS network interface card driver, wherein the virtual IP address is a virtual IP address obtained from the gateway after the client and the gateway establish a Secure Sockets Layer (SSL) tunnel, and wherein the NDIS network interface card driver is configured to send the new packet to the client, so that the client sends the new packet to the intranet server.

6. The client device according to claim 5, wherein the TDI driver is configured to:

obtain information about a packet flow for sending the original packet, wherein the information comprises the protocol type, the port number, and the PID; and notify the NDIS intermediate driver of the information, so that the NDIS intermediate driver stores the mapping relationship between the information.

7. The client device according to claim 5, wherein the client is configured to set, in the NDIS intermediate driver, a PID indicating whether to allow the process corresponding to the original packet to use the SSL VPN.

8. The client device according to claim 5, wherein the client is configured to:

receive a packet, from the intranet server, that is forwarded by the gateway;

change a destination address of the packet to the local address of the client device on which the client is located; and send the packet to the NDIS protocol driver using a raw socket interface, so that the NDIS protocol driver forwards the packet to a corresponding application program.

9. A virtual private network over Secure Sockets Layer (SSL VPN), comprising:

a client device comprising a processing hardware platform executing instructions stored on a non-transitory computer-readable storage medium, to perform functions as a plurality of modules, the plurality of modules comprise a Transport Driver Interface (TDI) driver, a Network Driver Interface Specification (NDIS) protocol driver, a NDIS intermediate driver, a NDIS network interface card driver, and a client;

a gateway; and an intranet server of the SSL VPN, wherein the client device communicates with the intranet server using the gateway, wherein the NDIS intermediate driver is configured to:

intercept an original packet sent by an application program to the intranet server;

determine, according to a process identification (PID) corresponding to the original packet, whether to allow a process corresponding to the original packet to use the SSL VPN by:

obtaining a protocol type and a port number of the original packet;

determining, according to a mapping relationship between a protocol type, a port number, and a PID, the PID corresponding to the original packet; and determining, according to the PID, whether to allow the process corresponding to the PID to use the SSL VPN;

establish a new packet when the process corresponding to the original packet is allowed to use the SSL VPN;

set a destination address of the new packet as a local address of the client device on which the application program is located;

set a destination port number of the new packet as a port number by which the client receives the original packet;

change a source Internet Protocol (IP) address of the original packet to a virtual IP address;

use the original packet as a payload of the new packet; and submit the new packet to the NDIS network interface card driver, wherein the virtual IP address is a virtual IP address obtained from the gateway after the client and the gateway establish a Secure Sockets Layer (SSL) tunnel, and wherein the NDIS network interface card driver is configured to send the new packet to the client, so that the client sends the new packet to the intranet server.

10. The SSL VPN according to claim 9, wherein the TDI driver is configured to:

obtain information about a packet flow for sending the original packet, wherein the information comprises the protocol type, the port number, and the PID; and notify the NDIS intermediate driver of the information, so that the NDIS intermediate driver stores the mapping relationship between the information.

11. The SSL VPN according to claim 9, wherein the client is configured to set, in the NDIS intermediate driver, a PID indicating whether to allow the process corresponding to the original packet to use the SSL VPN.

12. The SSL VPN according to claim 9, wherein the client is further configured to:

receive a packet, from the intranet server, that is forwarded by the gateway;

change a destination address of the packet to the local address of the client device on which the client is located; and send the packet to the NDIS protocol driver using a raw socket interface, so that the NDIS protocol driver forwards the packet to a corresponding application program.

* * * * *